(12) United States Patent
Wright et al.

(10) Patent No.: US 9,016,367 B2
(45) Date of Patent: *Apr. 28, 2015

(54) RF ANTENNA ASSEMBLY INCLUDING DUAL-WALL CONDUCTOR AND RELATED METHODS

(75) Inventors: Brian Wright, Indialantic, FL (US); Murray Hann, Malabar, FL (US); Keith Nugent, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 440 days.

This patent is subject to a terminal disclaimer.

(21) Appl. No.: 13/552,850

(22) Filed: Jul. 19, 2012

(65) Prior Publication Data

US 2014/0020908 A1 Jan. 23, 2014

(51) Int. Cl.
| | | |
|---|---|---|
| *E21B 36/00* | (2006.01) |
| *E21B 36/04* | (2006.01) |
| *E21B 43/24* | (2006.01) |
| *F16L 39/00* | (2006.01) |

(52) U.S. Cl.
CPC ........... *E21B 43/2401* (2013.01); *F16L 39/005* (2013.01)

(58) Field of Classification Search
CPC ....... E21B 17/18; E21B 17/203; E21B 21/12; E21B 17/028; E21B 43/2401; E21B 17/003; E21B 17/206; E21B 47/122; F16L 19/18; F16L 19/19; F16L 19/20
USPC ............... 166/248, 60, 302, 65.1, 242.6, 380; 175/320, 215; 285/123.1, 123.15, 285/123.16; 138/114
See application file for complete search history.

(56) References Cited

U.S. PATENT DOCUMENTS

| | | | | |
|---|---|---|---|---|
| 2,209,152 | A | * | 7/1940 | Daniels ........................ 174/88 C |
| 2,822,418 | A | * | 2/1958 | Dinnick ...................... 174/88 C |
| 3,471,177 | A | * | 10/1969 | Garrett et al. .............. 285/123.3 |
| 3,786,878 | A | * | 1/1974 | Chapman ...................... 175/320 |
| 4,067,596 | A | * | 1/1978 | Kellner et al. .............. 285/123.3 |
| 4,140,179 | A | * | 2/1979 | Kasevich et al. .............. 166/248 |
| 4,280,535 | A | * | 7/1981 | Willis ............................ 138/112 |
| 4,457,365 | A | * | 7/1984 | Kasevich et al. ................ 166/60 |
| 4,508,168 | A | * | 4/1985 | Heeren ......................... 166/248 |
| 4,620,593 | A | * | 11/1986 | Haagensen ................... 166/248 |
| 4,932,257 | A | | 6/1990 | Webb |
| 5,065,819 | A | * | 11/1991 | Kasevich ...................... 166/248 |
| 5,069,285 | A | | 12/1991 | Nuckols |
| 5,293,936 | A | * | 3/1994 | Bridges ......................... 166/248 |
| 7,055,599 | B2 | * | 6/2006 | Kasevich ...................... 166/248 |
| 7,091,460 | B2 | * | 8/2006 | Kinzer .......................... 219/772 |
| 7,152,700 | B2 | * | 12/2006 | Church et al. ................ 175/320 |
| 7,441,597 | B2 | | 10/2008 | Kasevich |
| 7,461,693 | B2 | * | 12/2008 | Considine et al. ........... 166/248 |
| 7,543,659 | B2 | * | 6/2009 | Partouche et al. ........... 175/320 |
| 7,692,428 | B2 | | 4/2010 | Clark et al. |
| 7,770,602 | B2 | | 8/2010 | Buschhoff |

(Continued)

*Primary Examiner* — Blake Michener
(74) *Attorney, Agent, or Firm* — Allen, Dyer, Doppelt, Milbrath & Gilchrist, P.A.

(57) ABSTRACT

A radio frequency (RF) antenna assembly to be positioned within a wellbore in a subterranean formation for hydrocarbon resource recovery may include a series of tubular conductors coupled together in end-to-end relation. Each tubular conductor may include a dual-wall conductor defining an RF antenna. The dual-wall conductor may include an outer wall and an inner wall spaced inwardly therefrom to define an outer fluid passageway. The RF antenna assembly may further include an RF transmission line extending within at least some of the tubular conductors.

20 Claims, 6 Drawing Sheets

(56) References Cited

U.S. PATENT DOCUMENTS

| | | | |
|---|---|---|---|
| 7,891,421 B2 | 2/2011 | Kasevich | |
| 8,240,375 B2* | 8/2012 | Briquet et al. | 166/242.6 |
| 8,443,887 B2* | 5/2013 | Parsche | 166/302 |
| 8,770,628 B2* | 7/2014 | Alhaug | 285/123.12 |
| 2005/0103497 A1 | 5/2005 | Gondouin | |
| 2005/0103527 A1* | 5/2005 | Church et al. | 175/62 |
| 2006/0283606 A1* | 12/2006 | Partouche et al. | 166/380 |
| 2008/0245570 A1* | 10/2008 | Partouche | 175/48 |
| 2010/0078163 A1 | 4/2010 | Banerjee et al. | |
| 2010/0282353 A1* | 11/2010 | Baylot et al. | 138/114 |
| 2010/0294488 A1 | 11/2010 | Wheeler et al. | |
| 2010/0294489 A1 | 11/2010 | Dreher, Jr. et al. | |
| 2012/0325516 A1* | 12/2012 | Bonn | 174/113 R |
| 2013/0180729 A1* | 7/2013 | Wright et al. | 166/380 |
| 2013/0334205 A1* | 12/2013 | Wright et al. | 219/541 |
| 2014/0041890 A1* | 2/2014 | Wright et al. | 174/19 |

\* cited by examiner

RF ANTENNA ASSEMBLY INCLUDING DUAL-WALL CONDUCTOR AND RELATED METHODS

FIELD OF THE INVENTION

The present invention relates to the field of radio frequency (RF) equipment, and, more particularly, to an RF antenna assembly, such as, for hydrocarbon resource recovery using RF heating and related methods.

BACKGROUND OF THE INVENTION

Energy consumption worldwide is generally increasing, and conventional hydrocarbon resources are being consumed. In an attempt to meet demand, the exploitation of unconventional resources may be desired. For example, highly viscous hydrocarbon resources, such as heavy oils, may be trapped in sands where their viscous nature does not permit conventional oil well production. This category of hydrocarbon resource is generally referred to as oil sands. Estimates are that trillions of barrels of oil reserves may be found in such oil sand formations.

In some instances, these oil sand deposits are currently extracted via open-pit mining. Another approach for in situ extraction for deeper deposits is known as Steam-Assisted Gravity Drainage (SAGD). The heavy oil is immobile at reservoir temperatures, and therefore, the oil is typically heated to reduce its viscosity and mobilize the oil flow. In SAGD, pairs of injector and producer wells are formed to be laterally extending in the ground. Each pair of injector/producer wells includes a lower producer well and an upper injector well. The injector/production wells are typically located in the payzone of the subterranean formation between an underburden layer and an overburden layer.

The upper injector well is used to typically inject steam, and the lower producer well collects the heated crude oil or bitumen that flows out of the formation, along with any water from the condensation of injected steam. The injected steam forms a steam chamber that expands vertically and horizontally in the formation. The heat from the steam reduces the viscosity of the heavy crude oil or bitumen, which allows it to flow down into the lower producer well where it is collected and recovered. The steam and gases rise due to their lower density. Gases, such as methane, carbon dioxide, and hydrogen sulfide, for example, may tend to rise in the steam chamber and fill the void space left by the oil defining an insulating layer above the steam. Oil and water flow is by gravity driven drainage urged into the lower producer well.

Many countries in the world have large deposits of oil sands, including the United States, Russia, and various countries in the Middle East. Oil sands may represent as much as two-thirds of the world's total petroleum resource, with at least 1.7 trillion barrels in the Canadian Athabasca Oil Sands, for example. At the present time, only Canada has a large-scale commercial oil sands industry, though a small amount of oil from oil sands is also produced in Venezuela. Because of increasing oil sands production, Canada has become the largest single supplier of oil and products to the United States. Oil sands now are the source of almost half of Canada's oil production, while Venezuelan production has been declining in recent years. Oil is not yet produced from oil sands on a significant level in other countries.

U.S. Published Patent Application No. 2010/0078163 to Banerjee et al. discloses a hydrocarbon recovery process whereby three wells are provided: an uppermost well used to inject water, a middle well used to introduce microwaves into the reservoir, and a lowermost well for production. A microwave generator generates microwaves which are directed into a zone above the middle well through a series of waveguides. The frequency of the microwaves is at a frequency substantially equivalent to the resonant frequency of the water so that the water is heated.

Along these lines, U.S. Published Patent Application No. 2010/0294489 to Dreher, Jr. et al. discloses using microwaves to provide heating. An activator is injected below the surface and is heated by the microwaves, and the activator then heats the heavy oil in the production well. U.S. Published Patent Application No. 2010/0294488 to Wheeler et al. discloses a similar approach.

U.S. Pat. No. 7,441,597 to Kasevich discloses using a radio frequency generator to apply radio frequency (RF) energy to a horizontal portion of an RF well positioned above a horizontal portion of an oil/gas producing well. The viscosity of the oil is reduced as a result of the RF energy, which causes the oil to drain due to gravity. The oil is recovered through the oil/gas producing well.

U.S. Pat. No. 7,891,421, also to Kasevich, discloses a choke assembly coupled to an outer conductor of a coaxial cable in a horizontal portion of a well. The inner conductor of the coaxial cable is coupled to a contact ring. An insulator is between the choke assembly and the contact ring. The coaxial cable is coupled to an RF source to apply RF energy to the horizontal portion of the well.

Unfortunately, long production times, for example, due to a failed start-up, to extract oil using SAGD may lead to significant heat loss to the adjacent soil, excessive consumption of steam, and a high cost for recovery. Significant water resources are also typically used to recover oil using SAGD, which impacts the environment. Limited water resources may also limit oil recovery. SAGD is also not an available process in permafrost regions, for example, or in areas that may lack sufficient cap rock, are considered "thin" payzones, or payzones that have interstitial layers of shale.

In RF heating applications, a rigid coaxial feed arrangement or transmission line may be desired to couple to a transducer or an antenna in the subterranean formation. Typical commercial designs of a rigid coaxial feed arrangement are not generally designed for structural loading or subterranean use, as installation generally requires long runs of the transmission line along the lines of 500-1500 meters, for example.

Increased power applied within the subterranean formation may result in antenna component heating. One factor that may contribute to the increased heating may be the length of the coaxial transmission line, for example. Component heating for the antenna may be undesirable, and may result in less efficient hydrocarbon resource recovery, for example.

A typical coaxial feed geometry may not allow for adequate flow of a cooling fluid based upon a relatively large difference in hydraulic volume between inner and outer conductors of the coaxial feed. More particularly, a typical coaxial feed may be assembled by bolted flanges with compressed face seals, for example. The coaxial feed also includes a small inner conductor with a standoff for the signal voltage. However, the typical coaxial feed may not be developed for use with a coolant and for increased thermal performance. Moreover, hydraulic volumes of the inner and outer conductors may be significantly different, which may affect overall thermal performance.

To more efficiently recover hydrocarbon resources, it may be desirable to inject a solvent, for example, in the subterranean formation. For example, the solvent may increase the effects of the RF antenna on the hydrocarbon resources. One approach for injecting a solvent within the subterranean formation includes the use of sidetrack wells that are typically used for instruction and are separate from the tubular conductors used for hydrocarbon resource recovery.

U.S. Patent Application Publication No. 2005/0103497 to Gondouin discloses a down-hole flow control apparatus, super-insulated tubular, and surface tools for producing heavy oil by steam injection. More particularly, Gondouin discloses using two dedicated and super-insulated vertical tubulars, coaxially carrying wet steam at the center, surrounded by heated oil through the coldest part of their environment.

U.S. Pat. No. 7,770,602 to Buschhoff discloses a double wall pipe. More particularly, Buschhoff discloses a double wall pipe with an inner high pressure pipe having an inner flow space for liquids. The double wall pipe also includes an outer protection pipe coaxially arranged around the inner pipe. The outer pipe has longitudinal grooves on an inner surface. The inner high pressure pipe is fitted tightly into the outer protection pipe.

It may thus be desirable to provide increased efficiency hydrocarbon resource recovery. More particularly, it may be desirable to provide increased cooling and/or solvent injection along with an RF antenna, using less components, for example.

SUMMARY OF THE INVENTION

In view of the foregoing background, it is therefore an object of the present invention to provide an RF antenna assembly that may include a cooling and/or solvent injection mechanism using less components, and that may provide increased RF hydrocarbon resource recovery efficiency.

This and other objects, features, and advantages in accordance with the present invention are provided by an RF antenna assembly to be positioned within a wellbore in a subterranean formation for hydrocarbon resource recovery. The RF antenna assembly includes a series of tubular conductors coupled together in end-to-end relation. Each tubular conductor includes a dual-wall conductor defining an RF antenna. The dual-wall conductor includes an outer wall and an inner wall spaced inwardly therefrom defining an outer fluid passageway. The RF antenna assembly further includes an RF transmission line extending within at least some of the tubular conductors. Accordingly, the RF antenna assembly provides increased efficiency hydrocarbon resource recovery via the dual-wall conductor. For example, the dual-wall conductor defines an antenna to heat the hydrocarbon resources, and may remove heat from the antenna by allowing coolant to pass through the fluid passageway, or may also allow solvent to pass through to increase hydrocarbon resource recovery.

A method aspect is directed to a method of making an RF antenna assembly section to be positioned within a wellbore in a subterranean formation for hydrocarbon resource recovery and to be coupled together in end-to-end relation with adjacent sections. The method includes providing a tubular conductor to include a dual-wall conductor defining an RF antenna. The dual-wall conductor includes an outer wall and an inner wall spaced inwardly therefrom defining an outer fluid passageway. The method further includes positioning an RF transmission line to extend within the tubular conductor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
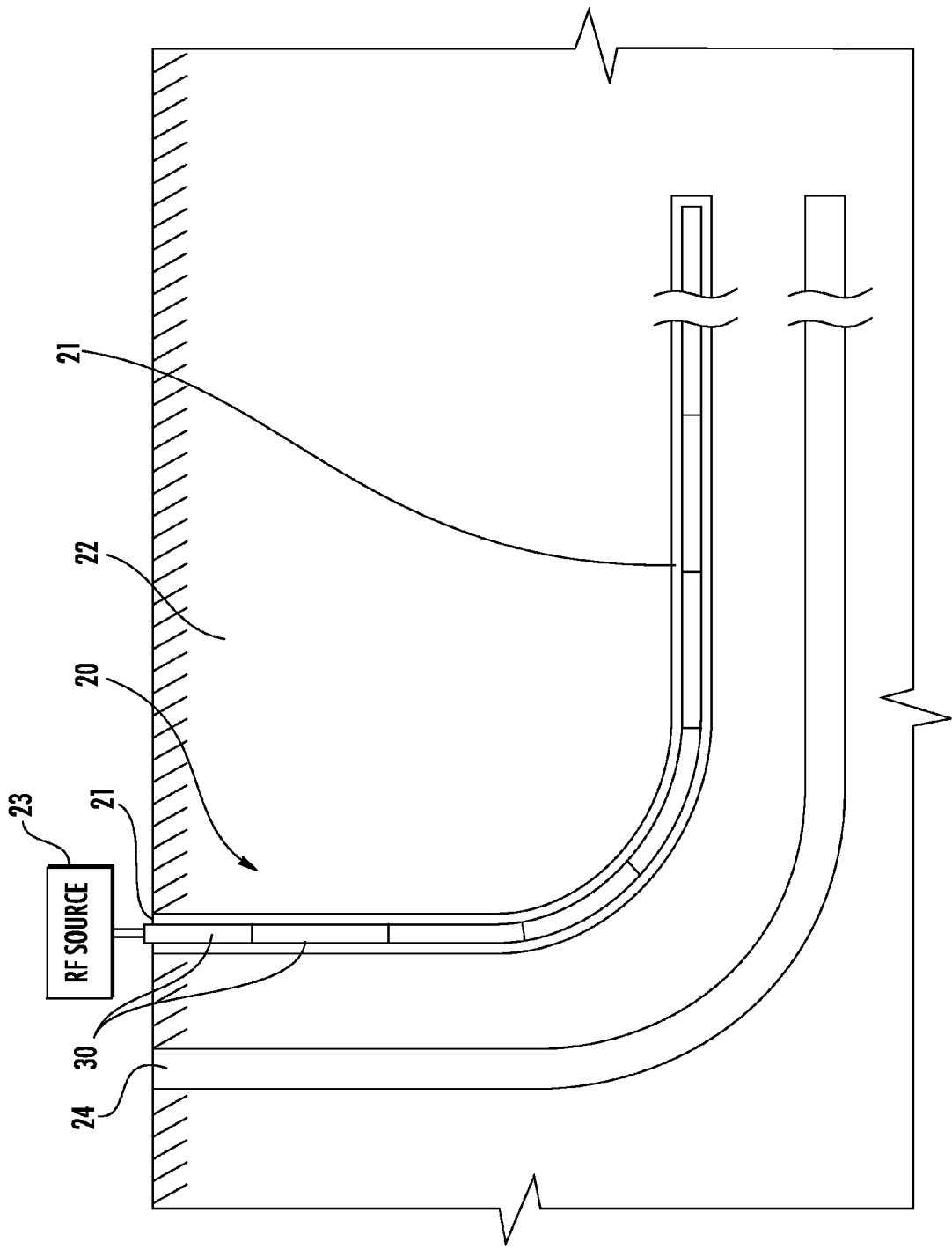
FIG. 1 is a schematic diagram of a subterranean formation including an RF antenna assembly in accordance with the present invention.

Referring initially to FIG. 1, a radio frequency (RF) antenna assembly 20 is positioned within a wellbore 21 in a subterranean formation 22. The subterranean formation 22 includes hydrocarbon resources. The wellbore 21 is in the form of a laterally extending wellbore, for example, as may be particularly advantageous for use RF assisted hydrocarbon resource recovery techniques. Of course, more than one wellbore and RF antenna assembly may be used, and/or other techniques for hydrocarbon resource recovery may be used, for example, the steam assisted gravity drainage (SAGD) hydrocarbon resource recovery technique. A separate producer well 24 may be positioned below the wellbore 21. The wellbore 21 could also be vertical in other embodiments.

The RF antenna assembly 20 is coupled to an RF source 23, which is positioned at the wellhead above the subterranean formation 22. The RF source 23 cooperates with the RF antenna assembly 20 to transmit RF energy within the subterranean formation 22 adjacent the hydrocarbon resources, for example, for heating the subterranean formation as will be described in further detail below. The RF antenna assembly 20 includes a series of tubular conductors 30, for example, each 40 feet long, coupled together in end-to-end relation.

Figure 2:
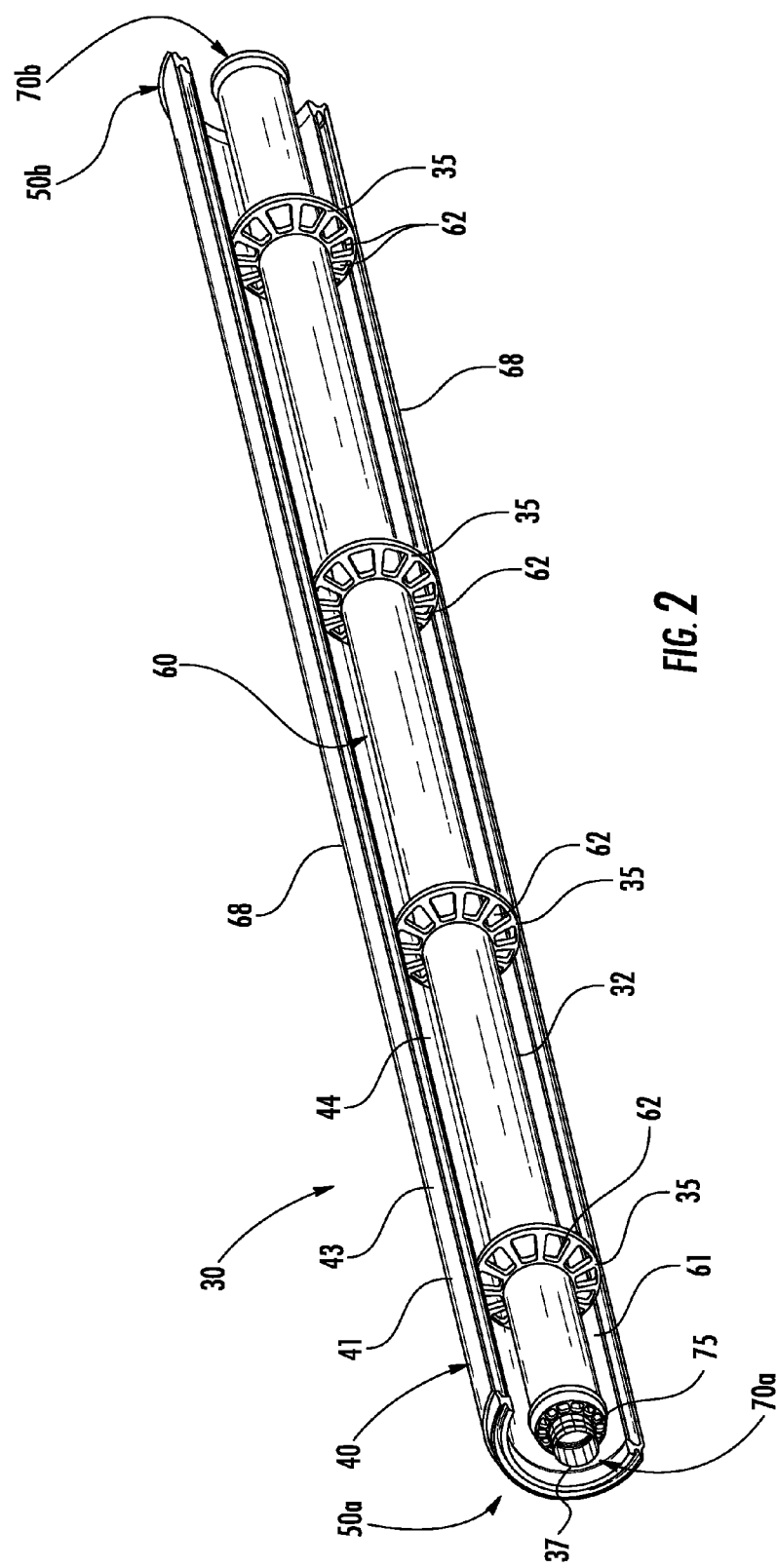
FIG. 2 is a partial cross-sectional view of a portion of a tubular conductor of FIG. 1.
Figure 3:
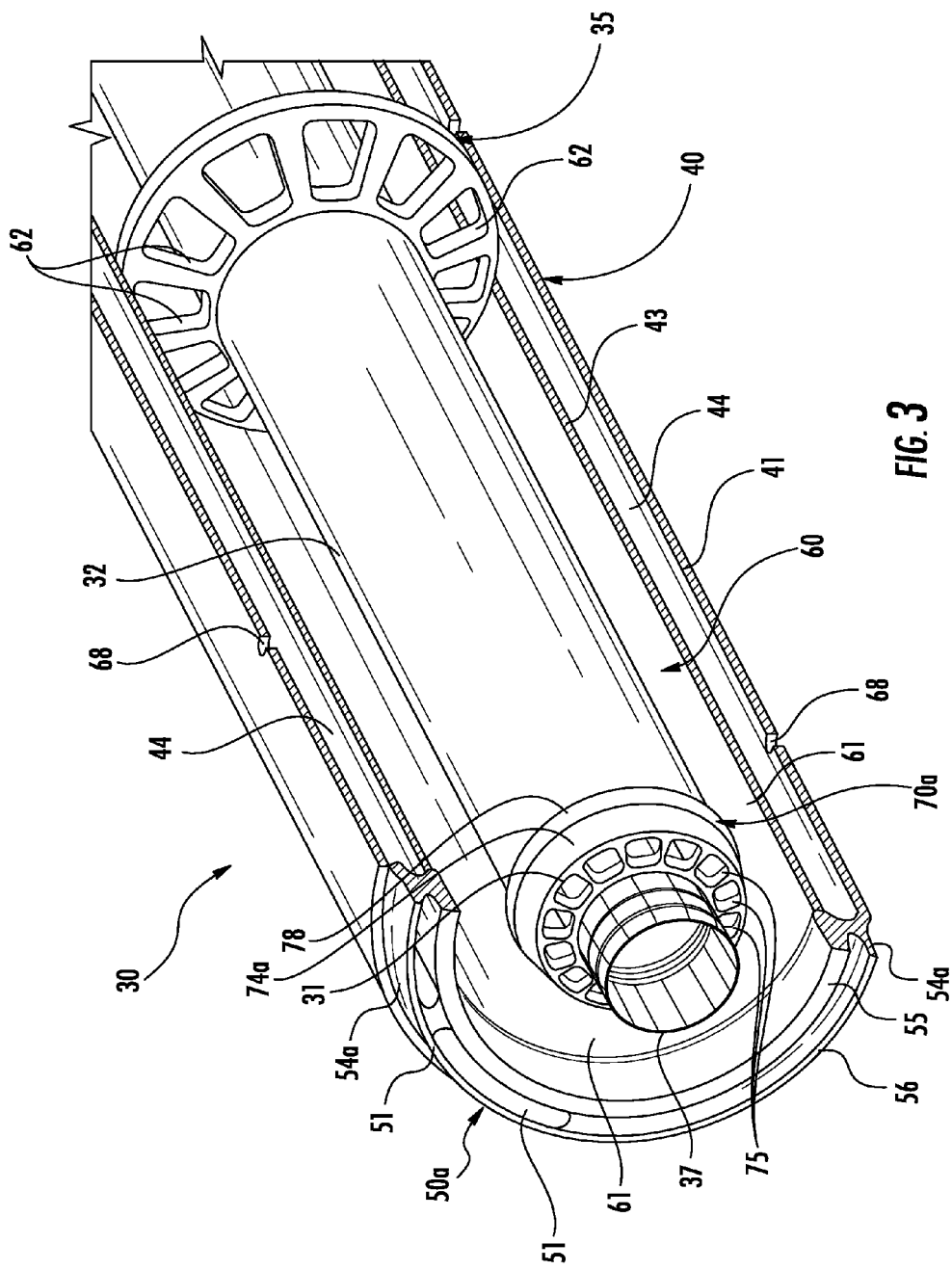
FIG. 3 is a greatly enlarged partial cross-sectional perspective view of an end of the tubular conductor of FIG. 2.
Figure 4:
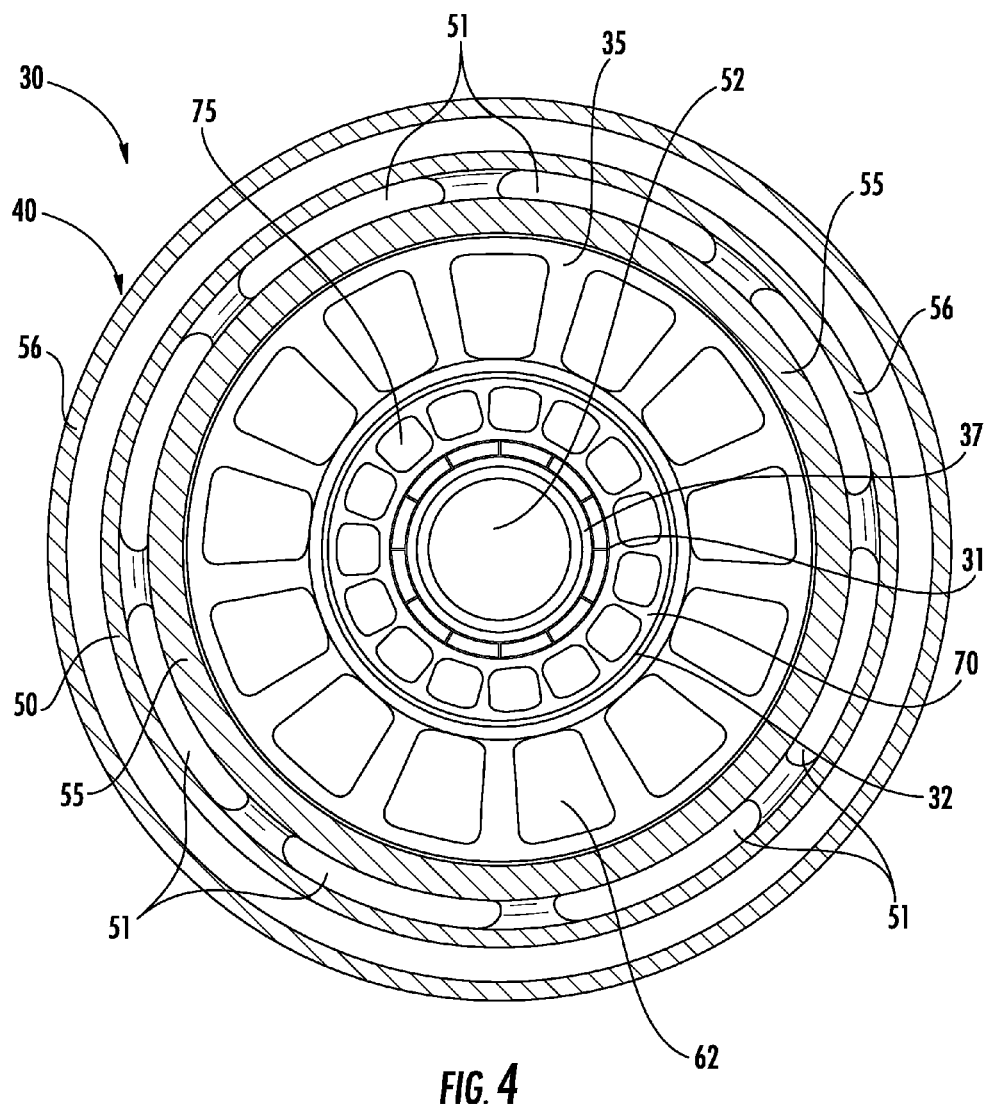
FIG. 4 is a lateral cross-sectional view of the tubular conductor of FIG. 2.

Referring now additionally to FIGS. 2-4, each tubular conductor 30 includes a dual-wall conductor 40 that defines an antenna. More particularly, the dual-wall conductor 40 may be coupled to the RF source 23 so that the dual-wall conductor supplies RF energy to the subterranean formation 22 adjacent the hydrocarbon resources. Of course, various techniques and coupling arrangements may be used so that selected tubular conductors 30 or a selected portion of the RF antenna assembly 20 supplies RF energy.

Each of the dual-wall conductors 40 includes an outer wall 41. The outer wall 41 by itself may be a wellbore casing. Advantageously, the dual-wall conductor 40 may be formed using a commercial off the shelf (COTS) tubular or well pipe, for example, and may not include threaded ends. In some embodiments, the dual-wall conductor 40 may be fitted within and coupled to an outer wall of a wellbore casing. The outer wall 41 may include flow ports 68, for example, when the tubular conductors 30 are configured in the injector or recovery configuration. Of course, flow ports 68 may not be used in areas that are designated for fluid transport, for example. The flow ports 68 would generally utilize a commercial method to reduce sand intrusion into the outer wall 41, such as a "slotted liner" technology available from G&L Slotco Oilfield Services Ltd. of Calgary, Canada, or a FACS RITE screen technology available from Schlumberger Ltd. of Houston, Tex.

Each dual-wall conductor 40 also includes an inner wall 43 spaced inwardly from the outer wall 41 to define an outer fluid passageway 44 or fluid annulus. Air, a coolant, a solvent, a recovered hydrocarbon (such as heavy oil, bitumen, and water), and/or steam may be passed through the fluid passageway 44. The dual-wall conductor 40 has a bore or central opening therein defined by the inner wall 43. The dual-wall conductor 40 provides an additional sealed annulus within the subterranean formation 22, and may maintain an electrical path and interface with adjacent tubular conductors. In this way, the dual-wall conductor 40 facilitates a separate annulus for any number of uses (solvent injection, hydrocarbon recovery, cooling fluid passage), while reducing the amount of reservoir fluids in an interior of the dual-wall antenna, thus allowing increased electromagnetic performance.

In addition, the outer wall 41 included may also allow for "production" (removal of hydrocarbon resources), and in this way the RF antenna may also function generally as the producer pipe in a typical SAGD installation. In addition, the outer wall 41 may allow for use of both solvent (to inject into the formation to further reduce the heavy oil viscosity) and production (to withdraw the hydrocarbon resource) using a timing (or cyclic) method, where the solvent is injected first, heating occurs, and then the system is reversed to recover hydrocarbon resources from the same passageway that was used for solvent injection. In this case described here, the outer wall 41 would be perforated to allow access between the outer fluid passageway 44 and the subterranean formation 22 (for solvent injection and hydrocarbon recovery or production). In the event that the outer fluid passageway 44 is used to carry antenna cooling fluid, the outer wall 41 would not be perforated.

Figure 5:
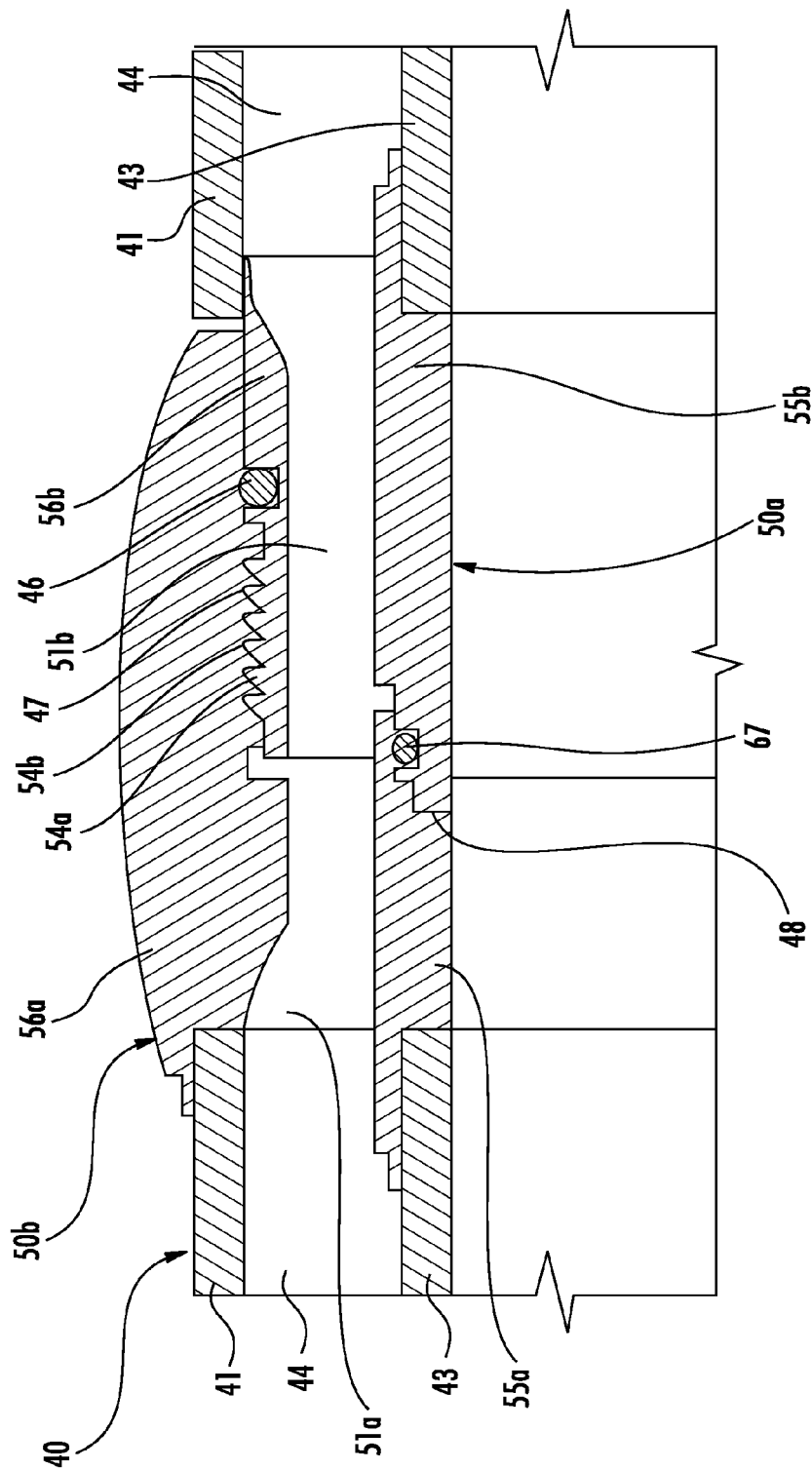
FIG. 5 is a cross-sectional view of threaded endpieces coupling adjacent dual-wall conductors in accordance with the present invention.

Referring now additionally to FIG. 5, each tubular conductor 30 also includes a pair of threaded endpieces 50a, 50b, also having a tubular shape, and coupling the outer and inner walls 41, 43 together at ends thereof. Each threaded endpiece 50a, 50b defines an overlapping mechanical threaded joint 47 with each other or an adjacent threaded endpiece. In other words, the threaded endpieces 50a, 50b couple to the ends of the inner and outer walls 43, 41 and extend outwardly therefrom so that opposing threaded ends define an overlapping mechanical threaded joint 47 with a threaded endpiece of an adjacent tubular conductor 30. In some embodiments, a gasket 46 or O-ring, for example, may be positioned in the threaded joint for an increased seal.

One threaded endpiece 50a is in the form of a male threaded endpiece and has threads 54a on the outside thereof. Another threaded endpiece 50b is in the form of a female threaded endpiece and has threads 54b on an interior thereof for receiving the male threads 54a from the male threaded endpiece 50a, and together they define the overlapping mechanical threaded joint 47. Each threaded endpiece 50a, 50b also includes a threaded endpiece inner wall coupling portion 55 and a threaded endpiece outer wall coupling portion 56 for coupling to the inner wall 43 and the outer wall 41, respectively. Each threaded endpiece 50 also has a bore or central opening therein defined by the inner wall coupling portion 55. A second gasket 67 or O-ring may be positioned adjacent the inner wall coupling portions 55.

As noted above, each threaded endpiece 50a, 50b may be coupled to the ends of inner and outer walls 43, 41 of the dual-wall conductor 40. The COTS tubular or wellpipe may come from the manufacturer without threaded ends so that each threaded endpiece 50 may be slid over or within and welded to the outer wall 41. More particularly, the male threaded endpiece 50a may be slid partially within and welded to the outer wall 41. The female threaded endpiece 50b may be slid over the outer wall 41 and be welded to the outer wall. In some embodiments, the female threaded endpiece 50b may slide partially within and be welded to the outer wall 41 similarly to the male threaded endpiece 50a. By way of the above-described coupling arrangement, the threaded endpieces 50, when coupled, may define a radially flush mechanical threaded joint 47 with adjacent portions of the dual-wall conductor 40. Of course, other coupling arrangements may be used.

Each threaded endpiece 50a, 50b also has a distal end that defines an electrical joint 48 with the outer threaded endpiece or with a distal end of an adjacent threaded endpiece. More particularly, the electrical joint 48 may be defined by the mating of the ends of the male and female threaded endpieces 50a, 50b. Thus, the electrical joint 48 is an electrically conductive compression joint, making electrical contact when adjacent threaded endpieces are mated.

Each threaded endpiece 50 also has fluid passageways therein 51 that are aligned with the outer fluid passageway 44 to allow fluid to flow therethrough and to define a single fluid passageway between the inner and outer walls 43, 41. Air, a solvent, a coolant, and/or steam may be passed through the fluid passageways 44, 51 to process or increase the efficiency of hydrocarbon resource recovery and/or reduce operating temperatures, for example.

The RF antenna assembly 20 also includes an RF transmission line 60 extending within the tubular conductor 30 and within the central opening of each threaded endpiece 50. The RF transmission line 60 is spaced inwardly from the dual-wall conductor 40 to define an intermediate passageway 61 therebetween. The intermediate passageway 61 may define a balun area or high voltage area, for example. The balun area 61 may be an oil-tuned balun and may thus be filled with oil or pressurized gas (such as nitrogen or SF6, as may be determined by analysis of the voltage state).

The RF transmission line 60 includes an inner conductor 31, and outer conductor 32 surrounding the inner conductor and spaced apart therefrom by a dielectric. The dielectric may be air, for example. The inner conductor 31 is spaced apart from the outer conductor 32 defining an inner fluid passageway 34, which carry, i.e., supply or return, cooling gas or hydrocarbon resources, for example.

Figure 6:
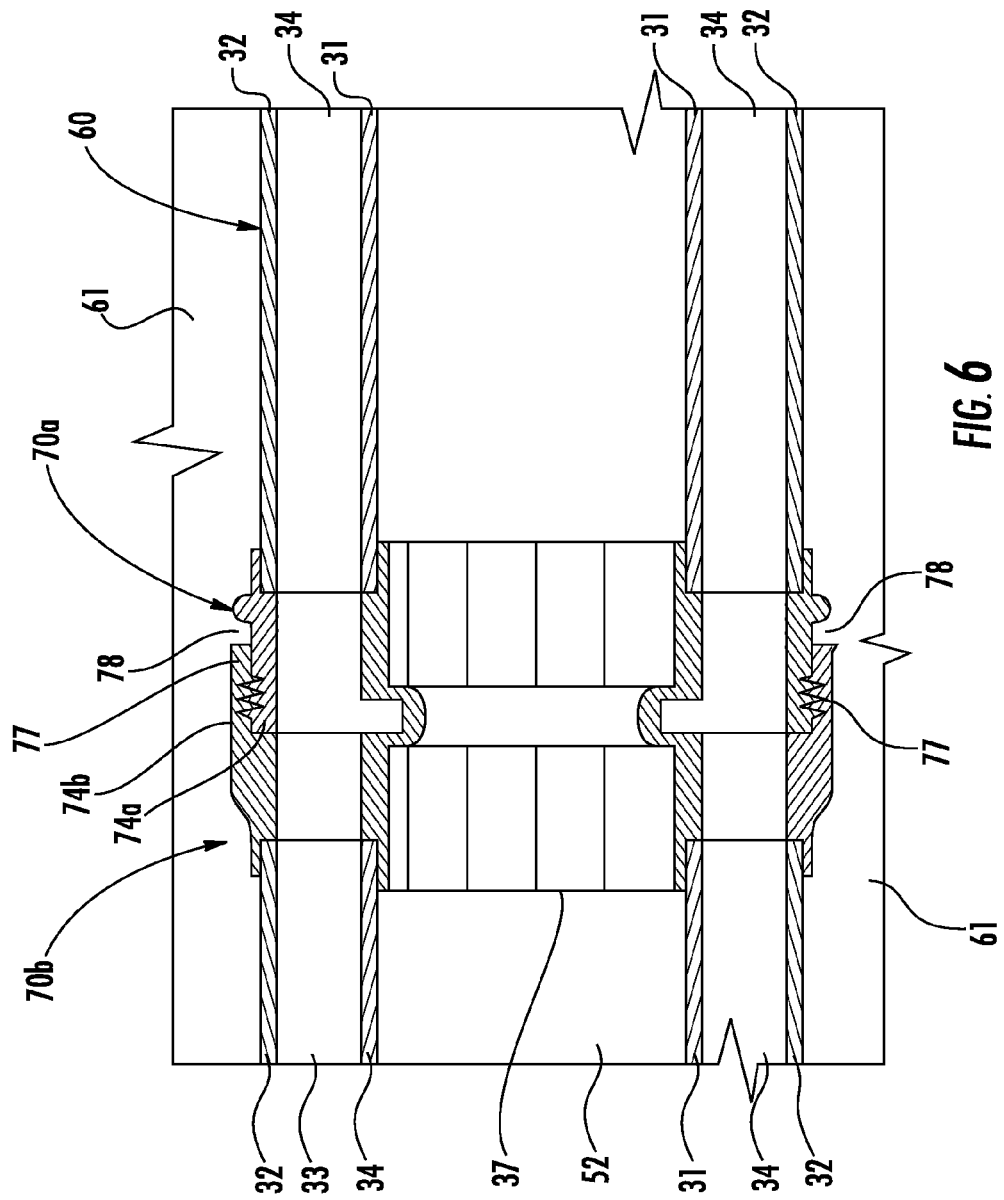
FIG. 6 is cross-sectional view of RF transmission line threaded endpieces coupling adjacent RF transmission lines in accordance with the present invention.

Referring now additionally to FIG. 6, each tubular conductor 30 also includes a pair of RF transmission line threaded dielectric endpieces 70a, 70b, also having a tubular shape, and coupled between the inner and outer conductors 31, 32 at ends thereof. Similar to the above-described threaded endpieces 50a, 50b, each RF transmission line endpiece 70a, 70b defines an overlapping mechanical threaded joint 77 with each other or an adjacent RF transmission line threaded endpiece. One RF transmission line threaded endpiece 70a is in the form of a male threaded endpiece and has threads 74a on the outside thereof. Another RF transmission line threaded endpiece 70b is in the form of a female threaded endpiece and has threads 74b on an interior thereof for receiving the male threads 74a from the male RF transmission line threaded endpiece 70a, and together they define the overlapping mechanical threaded joint 77, which may also be an electrical joint coupling adjacent outer conductors 32. Each RF transmission line threaded endpiece 70 also has fluid passageways therein 75 aligned with the inner fluid passageway 34, and a central opening. Each RF transmission line endpiece 70 may include a tool recess 78 for coupling to a tool during installation, for example.

Each tubular conductor 30 further includes spaced apart dielectric spacers 35 carried by the RF transmission line 60. Each dielectric spacer 35 has a bore therethrough wherein the RF transmission line 60 passes. Each dielectric spacer 35 also has fluid passageways 62 therein aligned with the intermediate fluid passageway 61 to allow fluid therein to pass through. The dielectric spacers 35 advantageously space the RF transmission line 60 from dual-wall conductor 40.

Each rigid coaxial section 30 also includes an inner conductor coupler 37 carried by the central opening or the bore of each RF transmission line threaded endpiece 70. The inner conductor coupler 37 electrically couples adjacent ends of the inner conductor 31.

The inner conductor 31 is a tubular inner conductor and defines yet another, innermost, fluid passageway 52 therethrough. Similar to the inner fluid passageway 34 the fluid passageway 52 defined by the tubular inner conductor 31 may carry, i.e., supply or return, cooling gas or hydrocarbon resources, for example.

The RF antenna assembly 20 includes multiple hydrocarbon processing passageways along with an antenna. For example, the RF antenna assembly 20 is configured to provide one or more of solvent and/or coolant injection, and recover hydrocarbon resources along with the antenna. Thus, fewer wellbores may be desired to recover a given amount of hydrocarbon resources, which may further reduce costs associated with recovering the hydrocarbon resources.

The RF antenna assembly 20 also advantageously is in the form of a single axis coaxial construction, which may provide for increased ease of installation and assembly. In other words, multiple isolated fluid passageways for cooling, solvent injection, and/or hydrocarbon resource transport are provided while structural rigidity may be maintained, with coaxial components supported within the RF antenna assembly 20. The isolation between fluid passageways may be maintained by the separation between the antenna and/or RF components, and the fluid passageways, which may keep the RF area relatively clean. The high voltage standoff regions may also be kept uncontaminated with either recovered hydrocarbon resources and/or solvents or coolants.

Moreover, the multiple walls, e.g., the dual-wall conductor 40, may be interchangeable and customized to desired hydraulic volumes and fluid flow characteristic, for example, to facilitate increased fluid flow. More particularly, hydraulic diameters may be matched relatively closely so that approximately equal flow may be applied to different cross sections.

A method aspect is directed to a method of making an RF antenna assembly section to be positioned within a wellbore 21 in subterranean formation 22 for hydrocarbon resource recovery, and to be coupled in end-to-end relation with adjacent sections. The method includes providing a tubular conductor 30 to include a dual-wall conductor 40 defining an RF antenna. The dual-wall conductor 40 includes an outer wall 41 and an inner wall 43 spaced inwardly therefrom defining an outer fluid passageway. The method further includes positioning an RF transmission line 60 to extend within the tubular conductor 30.

Many modifications and other embodiments of the invention will also come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) antenna assembly suitable to be positioned within a wellbore in a subterranean formation for hydrocarbon resource recovery, the RF antenna assembly comprising:
    a series of tubular conductors coupled together in end-to-end relation, each tubular conductor comprising a dual-wall conductor, said dual-wall conductor comprising an outer wall and an inner wall spaced inwardly therefrom to define an outer fluid passageway; and
    an RF transmission line extending within at least some of said tubular conductors and coupled to said series of tubular conductors so that said series of tubular conductors define an RF antenna, said RF transmission line comprising an inner conductor, an outer conductor surrounding said inner conductor, and a dielectric therebetween.

2. The RF antenna assembly according to claim 1, wherein each tubular conductor further comprises a threaded endpiece coupled to each opposing end of said dual-wall conductor and having threads to define an overlapping mechanical threaded joint and an electrical joint with an adjacent threaded endpiece.

3. The RF antenna assembly according to claim 2, wherein said threaded endpiece has a plurality of fluid passageways therein.

4. The RF antenna assembly according to claim 1, wherein each tubular conductor further comprises at least one dielectric spacer between said RF transmission line and said dual-wall conductor.

5. The RF antenna assembly according to claim 1, wherein each tubular conductor further comprises an RF transmission line threaded endpiece coupled to each opposing end of said inner and outer conductors and having threads to define an overlapping mechanical threaded joint with an adjacent RP transmission line threaded endpiece.

6. The RF antenna assembly according to claim 5, wherein said RF transmission line threaded endpiece has a plurality of fluid passageways therein.

7. The RF antenna assembly according to claim 5, further comprising an inner conductor coupler carried by said RF transmission line threaded endpiece and configured to electrically couple ends of adjacent inner conductors.

8. The RF antenna assembly according to claim 1, wherein said RF transmission line is spaced inwardly from said dual-wall conductor to define an intermediate passageway.

9. The RF antenna assembly according to claim 1, wherein said inner conductor comprises a tubular inner conductor defining another fluid passageway therethrough.

10. A radio frequency (RF) antenna assembly section suitable to be positioned within a wellbore in a subterranean formation for hydrocarbon resource recovery and to be coupled together in end-to-end relation with adjacent sections, the RF antenna assembly section comprising:
    a tubular conductor comprising
        a dual-wall conductor comprising
            an outer wall, and
            an inner wall spaced inwardly from said outer wall to define an outer fluid passageway; and
    an RF transmission line extending within said tubular conductor and coupled to said tubular conductor so that said tubular conductor defines an RF antenna, said RF transmission line comprising an inner conductor, an outer conductor surrounding said inner conductor, and a dielectric therebetween.

11. The RF antenna assembly section according to claim 10, wherein said tubular conductor further comprises a threaded endpiece coupled to each opposing end of said dual-wall conductor and having threads to define an overlapping mechanical threaded joint and an electrical joint with an adjacent threaded endpiece.

12. The RF antenna assembly section according to claim 11, wherein said threaded endpiece has a plurality of fluid passageways therein.

13. The RF antenna assembly section according to claim 10, wherein said tubular conductor further comprises an RF transmission line threaded endpiece coupled to each opposing end of said inner and outer conductors and having threads to define an overlapping mechanical threaded joint with an adjacent RF transmission line threaded endpiece.

14. The RF antenna assembly section according to claim 13, wherein said threaded endpiece has a plurality of fluid passageways therein.

15. The RF antenna assembly section according to claim 13, further comprising an inner conductor coupler carried by said RF transmission line threaded endpiece and configured to electrically couple ends of adjacent inner conductors.

16. A method of making a radio frequency (RF) antenna assembly section suitable to be positioned within a wellbore in a subterranean formation for hydrocarbon resource recovery, and to be coupled together in end-to-end relation with adjacent sections, the method comprising:

providing a tubular conductor to comprise a dual-wall conductor, the dual-wall conductor comprising an outer wall and an inner wall spaced inwardly therefrom defining an outer fluid passageway; and positioning an RF transmission line to extend within the tubular conductor and coupled to the tubular conductor so that said tubular conductor defines an RF antenna, wherein positioning the RF transmission line comprises spacing an outer conductor to surround an inner conductor, and to have a dielectric therebetween.

17. The method according to claim 16, further comprising coupling a threaded endpiece to each opposing end of the dual-wall conductor and having threads to define an overlapping mechanical threaded joint and an electrical joint with an adjacent threaded endpiece.

18. The method according to claim 17, wherein coupling the threaded endpiece comprises coupling a threaded endpiece having a plurality of fluid passageways therein.

19. The method according to claim 16, further comprising coupling an RF transmission line threaded endpiece to each opposing end of the inner and outer conductors and having threads to define an overlapping mechanical threaded joint with an adjacent RF transmission line threaded endpiece.

20. The method according to claim 16, wherein positioning the RF transmission line comprises positioning the RF transmission line to be spaced inwardly from the dual-wall conductor to define an intermediate passageway.

* * * * *